United States Patent [19]
Tomita

[11] Patent Number: 5,379,083
[45] Date of Patent: Jan. 3, 1995

[54] PROJECTOR

[75] Inventor: Akira Tomita, Redwood City, Calif.

[73] Assignee: Raychem Corporation, Menlo Park, Calif.

[21] Appl. No.: 196,924

[22] Filed: Feb. 15, 1994

[51] Int. Cl.⁶ .............................................. G03B 21/14
[52] U.S. Cl. .................................. 353/122; 353/97
[58] Field of Search ............... 353/31, 97, 122, 75; 359/48, 49, 40

[56] References Cited

U.S. PATENT DOCUMENTS

| | | | |
|---|---|---|---|
| 3,709,137 | 1/1973 | Starp | 95/64 D |
| 4,048,493 | 9/1977 | Lee | 250/205 |
| 4,060,318 | 11/1977 | Hansford | 353/42 |
| 4,078,861 | 3/1978 | Bohme | 353/97 |
| 4,468,720 | 8/1984 | Arai | 362/281 |
| 4,505,569 | 3/1985 | Seto et al. | 355/3 R |
| 4,592,632 | 6/1986 | Renold | 352/214 |
| 4,693,557 | 9/1987 | Fergason | 350/331 R |
| 4,891,738 | 1/1990 | Richardson et al. | 362/282 |
| 4,995,719 | 2/1991 | Shanks | 353/122 |
| 4,997,271 | 3/1991 | Shanks | 353/122 |
| 5,075,789 | 12/1991 | Jones et al. | 357/40 |
| 5,113,332 | 5/1992 | Richardson | 362/282 |
| 5,172,254 | 12/1992 | Atarashi et al. | 359/41 |
| 5,196,952 | 3/1993 | Hirai et al. | 359/51 |
| 5,245,449 | 9/1993 | Ooi et al. | 303/31 |
| 5,260,815 | 11/1993 | Takizawa | 353/31 |
| 5,274,480 | 12/1993 | Hirai et al. | 359/48 |

FOREIGN PATENT DOCUMENTS

| | | | |
|---|---|---|---|
| 0537731A1 | 4/1993 | European Pat. Off. | G03B 27/72 |
| 5-19346 | 1/1993 | Japan | G03B 21/00 |
| 2226174A1 | 6/1990 | United Kingdom | G09F 9/35 |

OTHER PUBLICATIONS

Dewey, "Projection Systems for Light Valves," IEEE Transactions on Electron Devices, vol. ED-24, No. 7, pp. 918–930 (Jul. 1977) Derwent Abstract No. 93-071705/09.

Primary Examiner—William A. Cuchlinski, Jr.
Assistant Examiner—William C. Dowling
Attorney, Agent, or Firm—Herbert G. Burkard; Yuan Chao

[57] ABSTRACT

A projector having a light valve which operates by alternatively transmitting incident light or scattering such light has adjustable illumination and projection apertures to maximize contrast ratio and brightness according to ambient light conditions.

20 Claims, 6 Drawing Sheets

PROJECTOR

TECHNICAL FIELD OF THE INVENTION

This invention relates to a projector for projecting images onto a screen.

BACKGROUND OF THE INVENTION

Projectors based on a light valve which controls the transmission or not of light therethrough by a scattering effect are known. See, e.g., Fergason, U.S. Pat. No. 4,693,557 (1987) and Jones et al., U.S. Pat. No. 5,075,789 (1991). A characteristic of such projectors is that brightness and contrast are both a function of the projection aperture. As the projection aperture decreases the contrast ratio increases but the brightness decreases, so that an improvement in one parameter is offset by a decrement in the other parameter. The situation is further complicated by the fact that projectors are not necessarily used in wholly darkened rooms, but, rather, under a variety of ambient lighting conditions. For instance, it may be desirable to have some minimal ambient lighting present to permit viewers to take notes of a presentation. So, a contrast ratio-brightness combination which may be optimized for a particular set of ambient lighting conditions may not be suitable for a different set of ambient lighting conditions.

SUMMARY OF THE INVENTION

The instant invention provides a projector which overcomes the foregoing limitations and permits adjustment of its brightness and contrast ratio to adapt to a variety of ambient lighting conditions.

Accordingly, this invention provides a projector, comprising:

(a) a source of light;
(b) a light valve which comprises a plurality of elements, each of which can be independently switched between a state in which incident light incident from the source is substantially transmitted or reflected and a state in which incident light from the source is substantially scattered to impart an image to the incident light;
(c) an illumination light controller which is disposed between the source and the light valve and is adjustable to provide a variable illumination aperture for controlling the degree of collimation of light reaching the light valve from the light source;
(d) projection lens for projecting onto a screen imaged light received from the light valve; and
(e) a projection aperture controller which is adjustable to provide a variable projection aperture for controlling the amount of imaged light transmitted by the light valve which is projected to the screen by the projection lens.

In a preferred embodiment, the projector further comprises a light sensor which senses the intensity of the ambient and the projected light and responsively adjusts the projection aperture of the projection aperture controller such that the real contrast ratio is a maximum. The real contrast ratio may be defined as $$\frac{P_{on} + P_{amb}}{P_{off} + P_{amb}}$$

where $P_{on}$ and $P_{off}$ are the screen brightness values for the "on" and "off" states of the light valve, respectively, and can be adjusted by controlling the projection aperture. $P_{amb}$ is the screen brightness due to ambient light.

Furthermore, the illumination aperture is adjusted to be less than the projection aperture.

In another embodiment, there is provided a projector, comprising:

(a) a source of light having a characteristic image size;
(b) a light valve which comprises a plurality of elements, each of which can be independently switched between a state in which incident light incident from the source is substantially transmitted or reflected and a state in which incident light from the source is substantially scattered to impart an image to the incident light;
(c) projection lens for projecting onto a screen imaged light received from the light valve; and
(d) a projection aperture controller which is adjustable to provide a variable projection aperture for controlling the amount of imaged light transmitted by the light valve which is projected to the screen by the projection lens;

the image size of the light source being smaller than the smallest aperture to which the projection aperture controller can be adjusted.

BRIEF DESCRIPTION OF THE DRAWING(S)

DESCRIPTION OF THE PREFERRED EMBODIMENTS

Figure 1A:
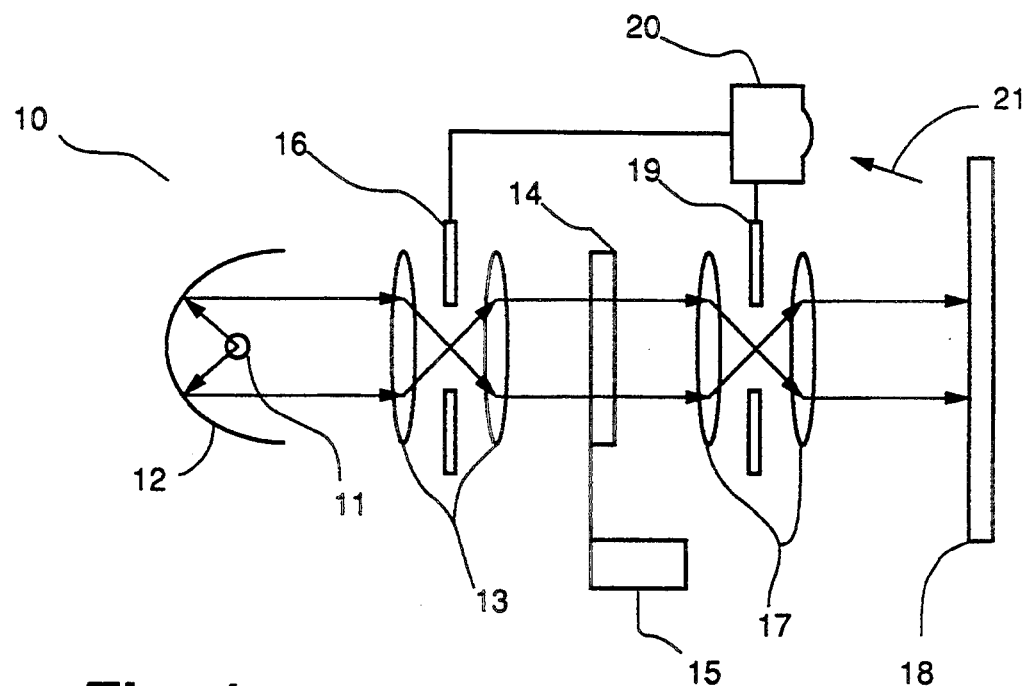
FIGS. 1a–1b show schematically projectors of this invention.

A projector 10 of this invention is shown schematically in FIG. 1a. Light from light source 11 is collimated and directed by parabolic mirror 12 and lens arrangement 13 towards a light-scattering light valve 14. (By creating a secondary image of the arc on the aperture plane using lens arrangement 13, the arc size can be reduced by adjusting the illumination aperture. Light valve 14 comprises a plurality of elements or pixels, each of which can be independently switched from a state in which incident light arriving from the light source is substantially transmitted (i.e., the element is substantially transparent) or is substantially scattered. Light valve 14 is connected to a controller 15, which may be for example a microcomputer and controls which elements are transmissive or scattering. Disposed between light valve 14 and light source 11 is an illumination aperture controller 16, which can be adjusted to provide a variable illumination aperture, thereby controlling the degree of collimation of light reaching light valve 14 from light source 11. Light transmitted by light valve 14 is projected by lens arrangement 17 onto a screen 18 where the image can be viewed. A projection aperture controller 19 is disposed between light valve 14 and screen 18. The aperture of controller 19 is variable, thereby permitting control of the amount of light which is projected by lens arrangement 17 onto screen 18.

Optionally projector 10 includes a light sensor 20 which senses the ambient light intensity as well as projected image intensity (denoted by ray 21). Sensor 20 is connected to and controls projection light controller 19 and responsively adjusts the latter's projection aperture such that the real contrast ratio is maximized under various ambient light conditions. Further the illumination aperture is adjusted such that the illumination aperture is less than the projection aperture as the projection aperture is adjusted by sensor 20. If sensor 20 is not used to automatically control the illumination and projection apertures, the apertures may be controlled manually, mechanically or electromechanically, the viewer adjusting them to the settings which provide him or her with the maximum real contrast, i.e., best image quality. Generally, this will occur where the projection aperture is greater than or equal to the illumination aperture. Reducing the projection aperture can increase the contrast ratio when the illumination aperture is less than the projection aperture.

Figure 2:
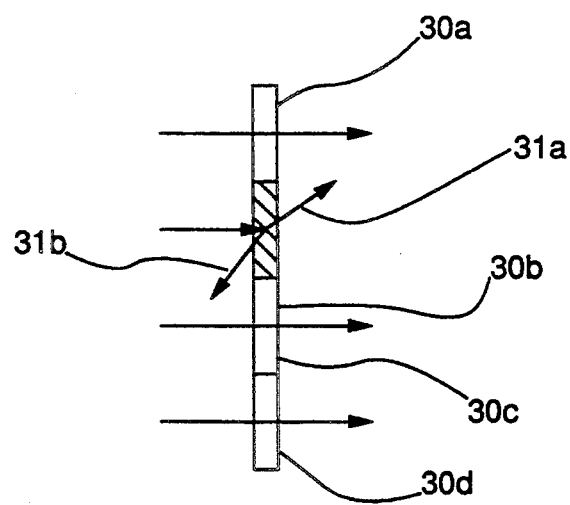
FIG. 2 shows in magnified detail several pixels of the light scattering light valve of the projector.

FIG. 2 shows in magnified detail four elements 30a–d of light valve 14. Elements first 30a, 30c, and 30d are shown in their substantially transparent states, so that incident light is transmitted therethrough. Element 30b is shown in its light scattering state, so that it scatters incident light. The scattering may be either forwardly (ray 31a) or backwardly (ray 31b) or, as is normally the case, both. By controlling which elements are in the transparent or scattering states, an image can be imparted to the incident light.

Figure 1B:
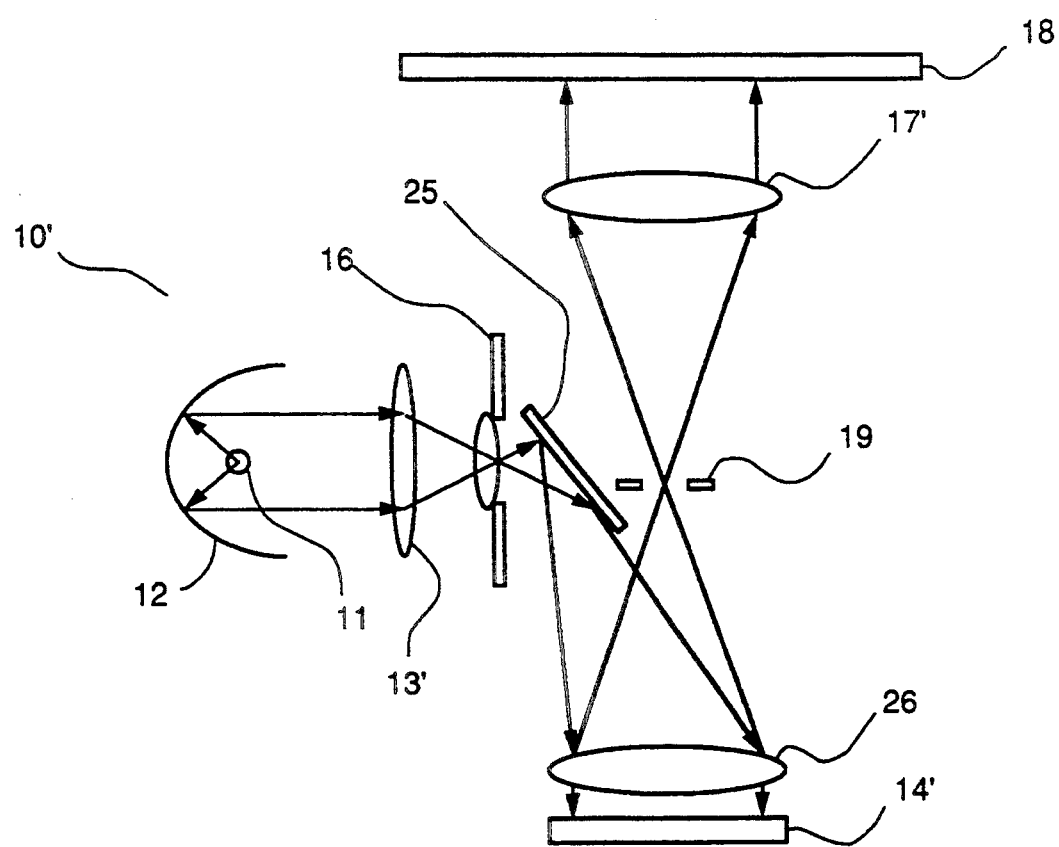

In FIGS. 1a and 2 light valve 14 has been shown as operating in a transmissive mode, but for the sake of compactness or other design considerations, light valve 14 can be made to operate in a reflective mode (that is, incident light is either reflected or not), so that the projector may have a folded-up compact design. Such a design is shown schematically in FIG. 1b, where numerals repeated from FIG. 1a indicate like elements. Light passing through aperture controller 16 is reflected by mirror 16 towards lens 26, which focuses the light onto reflective light valve 14'. Light which is reflected by light valve 14' is then directed towards projection light controller 19 and lens 17' and projected onto screen 18.

In a preferred embodiment, the light valve comprises a liquid crystal-polymer composite as the electrooptically active component. In a liquid crystal-polymer composite, discrete volumes of a liquid crystal material are encapsulated, dispersed, embedded or otherwise contained in a matrix polymer. The volumes are not necessarily limited to spherical or substantially spherical ones. They may be irregularly shaped, and even interconnected. The amount of interconnection between volumes may be to an extent such that the liquid crystal material appears to form a continuous phase. "Liquid crystal material" denotes a material having liquid crystalline properties, whether that composition consists of a single discrete liquid crystalline compound, a mixture of different liquid crystalline compounds, or a mixture of liquid crystalline and non-liquid crystalline compounds. Preferably, the liquid crystal material is nematic or operationally nematic. More preferably, it also has a positive dielectric anisotropy.

Suitable matrix polymers include but are not limited to poly(vinyl alcohol) ("PVA") and its copolymers, gelatin, polyurethane, latexes, poly(ethylene oxide), poly(vinyl pyrrolidone), cellulosic polymers, natural gums, acrylic and methacrylic polymers and copolymers, epoxies, polyolefins, vinyl polymers, and the like. PVA is a preferred containment medium.

Suitable liquid crystal-polymer composites and their method of preparation are disclosed in U.S. Pat. Nos. 4,435,047 (1984), 4,606,611 (1986), 4,616,903 (1986), and 4,707,080 (1987), all to Fergason; published European patent application EP 156,615 (1985), by Pearlman et al.; U.S. Pat. No. 4,671,618 (1987), to Wu et al.; U.S. Pat. Nos. 4,673,255 (1987) and 4,685,771 (1987), to West et al.; U.S. Pat. No. 4,688,900 (1987) to Doane et al.; and published European patent application EP 0,313,053 (1989). by Dainippon Ink and Chemicals; the disclosures of each which are incorporated herein by reference.

Figure 3A:
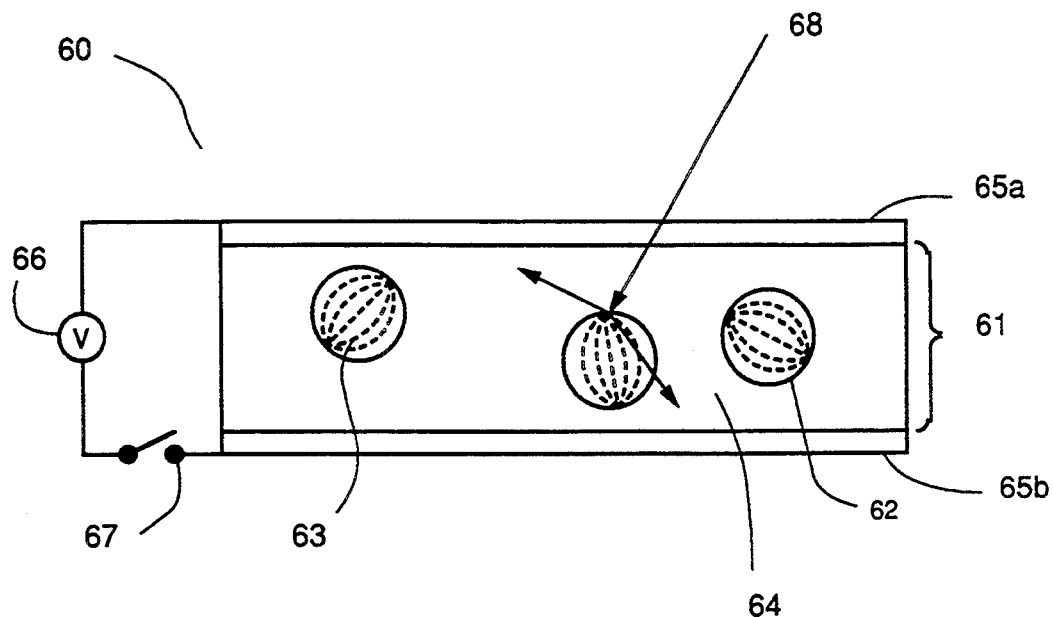
FIGS. 3a–3d show the mode of operation of a liquid crystal-polymer composite suitable for use in the light valve of the projector.
Figure 3B:
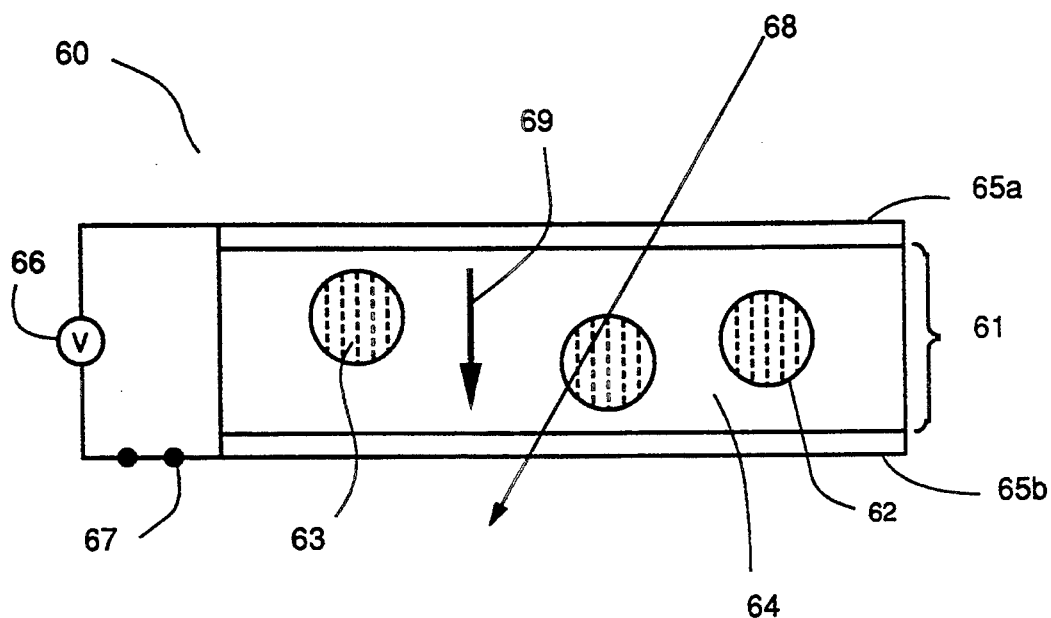

FIGS. 3a–3b show the mode of operation of a liquid crystal-polymer composite light valve suitable for use in projectors of this invention. Light valve 60 comprises a liquid crystal-polymer composite 61 in which droplets or volumes 62 of nematic liquid crystal material 63 having a positive dielectric anisotropy are dispersed in a matrix polymer 64. Composite 61 is sandwiched between first and second electrodes 65a and 65b, made from a transparent conductor such as indium tin oxide ("ITO"). The application or not of a voltage across electrodes 65a and 65b from power source 66 is controlled by switch 67, shown in FIG. 3a in the open position ("off-state"). As a result, no voltage is impressed across composite 61 and the electric field experienced by liquid crystal material 63 is effectively zero. Due to surface interactions, the liquid crystal molecules preferentially lie with their surfaces parallel to the curved interface with matrix polymer 64, resulting in a generally curvilinear alignment within each droplet. The curvilinear axes in different droplets 62 are randomly oriented, as symbolized by the differing orientations of the curvilinear patterns. Liquid crystal material 63 has an extraordinary index of refraction $n_e$ which is different from and but an ordinary index of refraction $n_o$ which is the substantially the same as index of refraction $n_p$ of the matrix polymer. Incident light ray 68 traveling through composite, 61 has a high statistical probability of encountering at least one interface between matrix polymer 64 and liquid crystal material 63 in which the liquid crystal index of refraction with which it operatively interacts is $n_e$. Since $n_e$ is different from the index of refraction n of the containment medium, there is refraction, or scattering of light ray 68, both forwardly and backwardly, causing composite 61 to have a translucent or frosty appearance.

FIG. 3b shows light valve 60 in the on-state, with switch 67 closed. An electric field is applied between electrodes 65a and 65b and across composite 61, with a directionality indicated by arrow 69. Liquid crystal material 63, being positively dielectrically anisotropic, aligns parallel to the electric field direction. (The required voltage is dependent inter alia on the thickness of the composite and typically is between 3 and 50 volts.) Further, this alignment with the field occurs in each droplet 62, so that there is order among the directors from droplet to droplet, as shown symbolically in FIG. 3b. When the liquid crystal molecules are aligned in this manner, the liquid crystal index of refraction with which incident light ray 68 operatively interacts is $n_o$. Because $n_o$ is substantially the same as $n_p$, there is no scattering at the liquid crystal-containment medium interface. As a result, ray 18 is transmitted through composite 61, which now appears transparent. Transmission rates of at least 50%, and preferably on the order of 70% or higher may be attained.

Figure 3C:
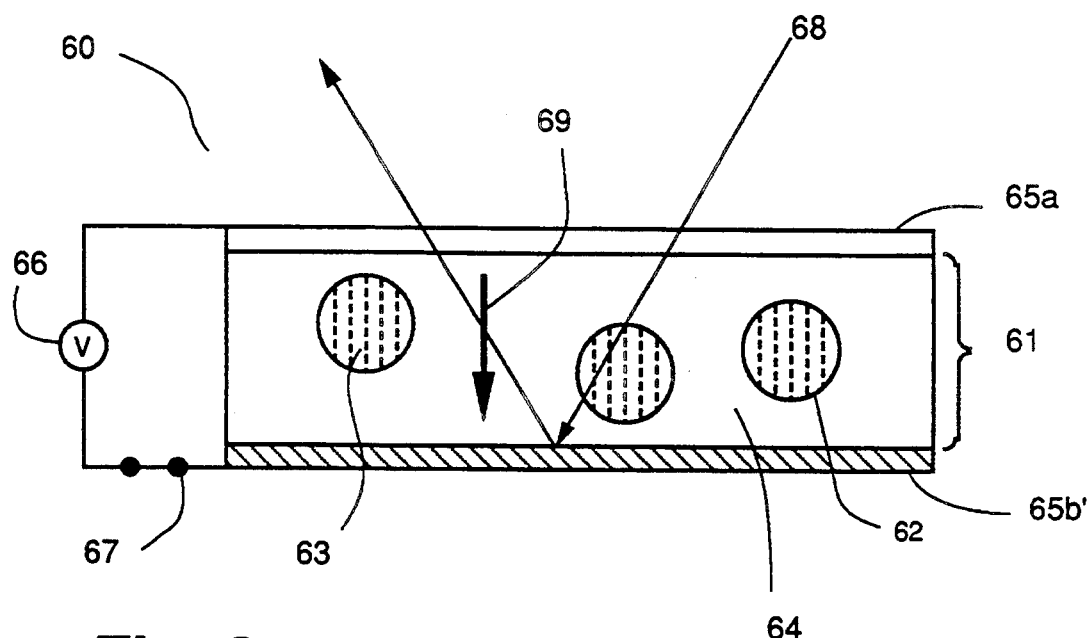
Figure 3D:
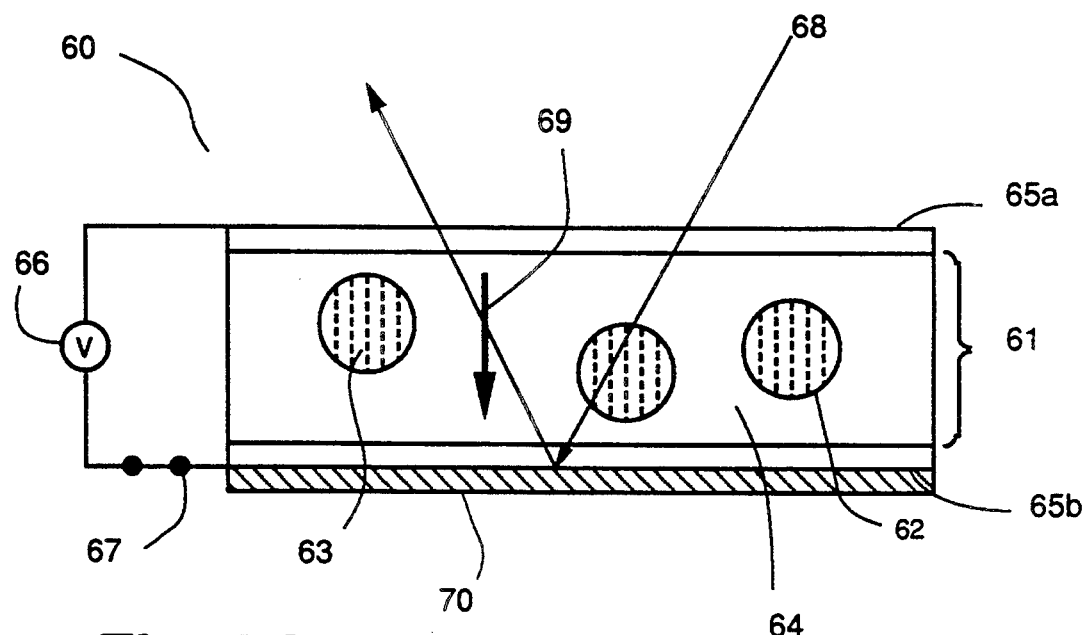

The light valve of FIGS. 3a–3b can be readily modified for operation in the reflective mode. Two such modifications are shown in FIGS. 3b and 3c (numerals like those in FIGS. 3a–3b denoting like elements). In the embodiment of FIG. 3c, rear electrode 65b' is not transparent, but reflective. Thus, when composite 61 is in its light transmissive state, the light transmitted therethrough is reflected by rear electrode 65b' and again through composite 61. In the embodiment of FIG. 3d, rear electrode 65b is transparent, but a reflector 70 is positioned therebehind, with similar operational effect.

Figure 4:
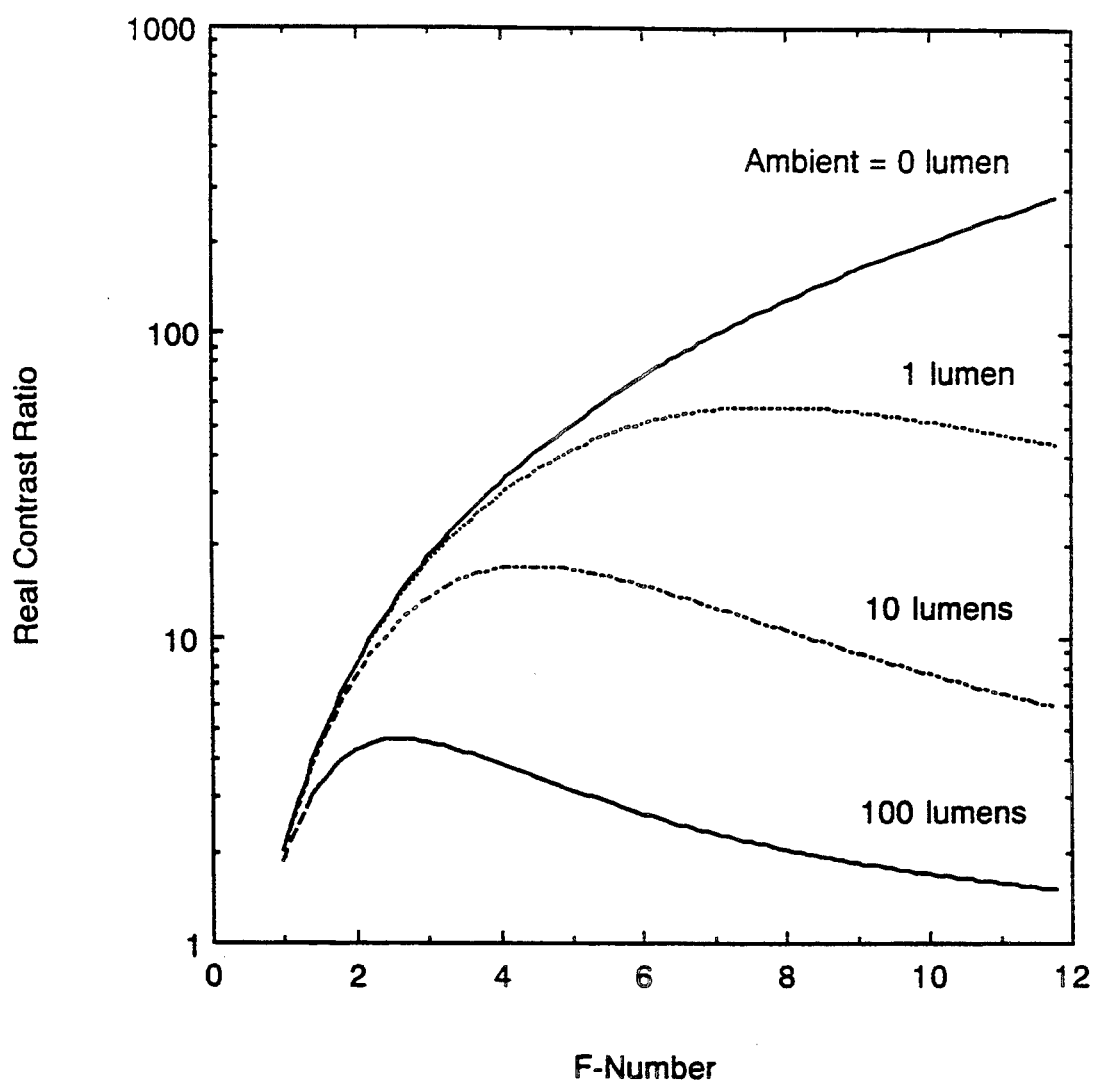
FIG. 4 shows how the apertures in a projector of this invention can be adjusted for optimal contrast ratio.

In evaluating the performance era projector, it is common to measure an ideal contrast ratio that is measured in a totally dark room. However, when a projector is used in a lighted room, picture quality is determined not by this ideal contrast ratio but by a real contrast ratio, which factors in the amount of ambient lighting. If the ambient light significantly increases the black (off-state) light level in the projected image, the real contrast ratio may be much lower than the ideal contrast ratio. The projection onto the screen of stray light which has been forwardly scattered by the light valve may also contribute to decreasing the blackness of the off-state. Therefore, to maximize the real contrast ratio, the projector needs to be operated at an optimum aperture (f-stop) for a given ambient light condition. The (f-stop) is optimal when the real contrast ratio, given by the relationship $$\frac{P_{on} + P_{amb}}{P_{off} + P_{amb}}$$

becomes a maximum. A projector which has a fixed aperture, which is "factory-set," as it were, to provide good contrast for a given set of ambient light conditions, may provide unsatisfactory contrast ratio under a different set of ambient light conditions. For example, referring now to FIG. 4, it can be seen that to maximize the real contrast ratio, the projection aperture can be adjusted to f/2.5, f/4, and f/7.5, for ambient light levels of 100, 10, and 1 lumens, respectively.

Figure 5A:
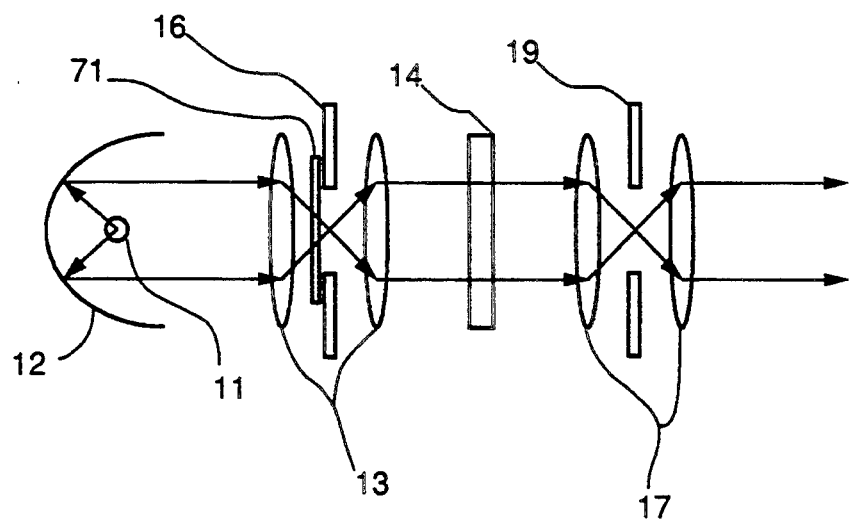
FIGS. 5a–5b show how the image of the light source can have an effect on the necessity for aperture control.

Generally, the desirability of having a controllable illumination aperture is linked to the necessity of reducing the effective light source image size in order to achieve high contrast ratios. This is shown schematically in FIG. 5a, where numerals repeated from prior figures denote like elements. In the figure light source 11 is of a relatively large size, such that its effective image 71 size is larger than the smallest aperture to which the projection aperture controller can be set. In such art instance, an adjustable illumination aperture controller 16 is needed to control the illumination aperture so that it is as large as possible (for enhancing brightness) but yet smaller than the projection aperture (for enhancing contrast).

Figure 5B:
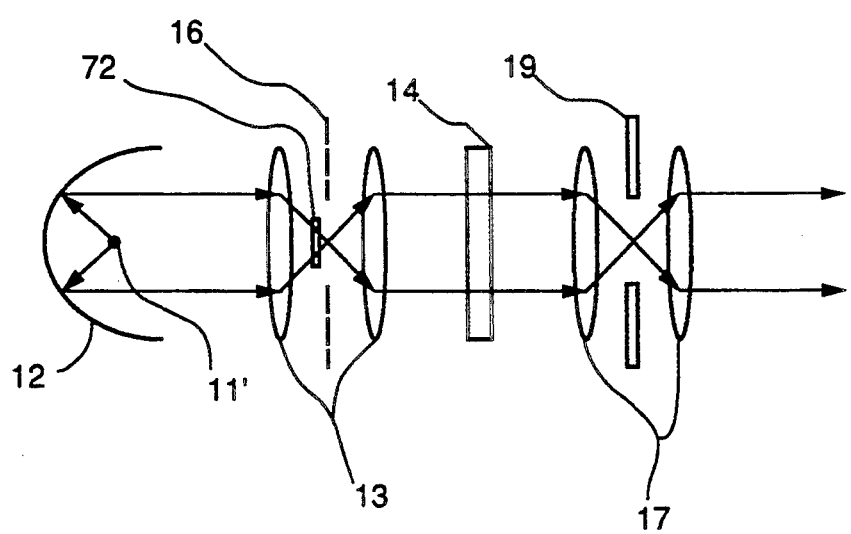

A different situation is shown in FIG. 5b, where light source 11' is of a relatively small size, such that it has an image size 72 smaller than the smallest settable projection aperture. In such an instance, an illumination aperture controller 16 is not needed to control the size of the illumination aperture and hence controller 16 is shown as a dotted line.

Preferably the light valve is of the active matrix type, in which each pixel (or picture element) is driven (switched from one visual state to another) by an active switching element such as a thin film transistor ("TFT"), varistor, diode, or metal-insulator-metal element ("MIM"). The switching element helps eliminate cross-talk and maintain an initially applied voltage across the corresponding pixel, even when it is not being actively addressed, so that the pixel stays "on" while other pixels are addressed. The longer the pixels holds the initially applied voltage, the longer it can be maintained in the "on" state until it is next addressed, permitting the construction of displays having a larger number of pixels. If the matrix contains a sufficiently large number of switching element of sufficiently small size, high resolution displays are possible.

Active matrix driven projectors of this invention are useful as television, computer, or instrument screens or monitors. Active matrix displays and light valves employing liquid crystal-polymer composites are disclosed in Becker et al., U.S. Pat. No. 5,124,822 (1992), and Kamath et al., U.S. Pat. No. 5,233,445 (1993), the disclosures of which are incorporated herein by reference.

The foregoing detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

What is claimed is:

1. A projector, comprising:
   (a) a source of light;
   (b) a light valve which comprises a plurality of elements, each of which can be independently switched between a state in which incident light incident from the source is substantially transmitted or reflected and a state in which incident light from the source is substantially scattered to impart an image to the incident light;
   (c) an illumination light controller which is disposed between the source and the light valve and is adjustable to provide a variable illumination aperture for controlling the degree of collimation of light reaching the light valve from the light source;
   (d) projection lens for projecting onto a screen imaged light received from the light valve; and
   (e) a projection aperture controller which is adjustable to provide a variable projection aperture for controlling the amount of imaged light transmitted by the light valve which is projected to the screen by the projection lens.

2. A projector according to claim 1, wherein the light valve comprises a liquid crystal-polymer composite in which plural volumes of a liquid crystal material are dispersed in a matrix polymer.

3. A projector according to claim 2, wherein the liquid crystal material is nematic liquid crystal material having a positive dielectric anisotropy.

4. A projector according to claim 1, further comprising a light sensor which senses the ambient light intensity and responsively adjusts the projection aperture such that the real contrast ratio is maximized.

5. A projector according to claim 4, wherein the light valve comprises a liquid crystal-polymer composite in which plural volumes of a liquid crystal material are dispersed in a matrix polymer.

6. A projector according to claim 5, wherein the liquid crystal material is nematic liquid crystal material having a positive dielectric anisotropy.

7. A projector according to claim 4, wherein the sensor further controls the illumination aperture such that the illumination aperture is less than the projection aperture.

8. A projector according to claim 7, wherein the light valve comprises a liquid crystal-polymer composite in which plural volumes of a liquid crystal material are dispersed in a matrix polymer.

9. A projector according to claim 8, wherein the liquid crystal material is nematic liquid crystal material having a positive dielectric anisotropy.

10. A projector according to claim 1, wherein the elements in the light valve switch between a state in which incident light incident from the source is substantially transmitted and a state in which incident light from the source is substantially scattered.

11. A projector according to claim 10, wherein the light valve comprises a liquid crystal-polymer composite in which plural volumes of a liquid crystal material are dispersed in a matrix polymer.

12. A projector according to claim 11, wherein the liquid crystal material is nematic liquid crystal material having a positive dielectric anisotropy.

13. A projector according to claim 1, wherein the elements in the light valve switch between a state in which incident light incident from the source is substantially reflected and a state in which incident light from the source is substantially scattered.

14. A projector according to claim 13, wherein the light valve comprises a liquid crystal-polymer composite in which plural volumes of a liquid crystal material are dispersed in a matrix polymer.

15. A projector according to claim 14, wherein the liquid crystal material is nematic liquid crystal material having a positive dielectric anisotropy.

16. A projector, comprising:
    (a) a source of light having a characteristic image size;
    (b) a light valve which comprises a plurality of elements, each of which can be independently switched between a state in which incident light incident from the source is substantially transmitted or reflected and a state in which incident light from the source is substantially scattered to impart an image to the incident light;
    (c) projection lens for projecting onto a screen imaged light received from the light valve; and
    (d) a projection aperture controller which is adjustable to provide a variable projection aperture for controlling the amount of imaged light transmitted by the light valve which is projected to the screen by the projection lens;

the image size of the source of light being smaller than the smallest aperture to which the projection aperture controller can be adjusted.

17. A projector according to claim 16, wherein the light valve comprises a liquid crystal-polymer composite in which plural volumes of a liquid crystal material are dispersed in a matrix polymer.

18. A projector according to claim 17, wherein the liquid crystal material is nematic liquid crystal material having a positive dielectric anisotropy.

19. A projector according to claim 17, wherein the elements in the light valve switch between a state in which incident light incident from the source is substantially transmitted and a state in which incident light from the source is substantially scattered.

20. A projector according to claim 17, wherein the elements in the light valve switch between a state in which incident light incident from the source is substantially reflected and a state in which incident light from the source is substantially scattered.

* * * * *